United States Patent
Tanaka et al.

(10) Patent No.: US 9,964,451 B2
(45) Date of Patent: May 8, 2018

(54) TEMPERATURE SENSOR

(71) Applicant: MITSUBISHI MATERIALS CORPORATION, Tokyo (JP)

(72) Inventors: Hiroshi Tanaka, Naka (JP); Hitoshi Inaba, Naka (JP); Kazuta Takeshima, Naka (JP); Noriaki Nagatomo, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 633 days.

(21) Appl. No.: 14/389,089

(22) PCT Filed: Mar. 26, 2013

(86) PCT No.: PCT/JP2013/060137
§ 371 (c)(1),
(2) Date: Sep. 29, 2014

(87) PCT Pub. No.: WO2013/147310
PCT Pub. Date: Oct. 3, 2013

(65) Prior Publication Data
US 2015/0085898 A1    Mar. 26, 2015

(30) Foreign Application Priority Data

Mar. 30, 2012 (JP) ................................. 2012-081109

(51) Int. Cl.
*G01K 7/00* (2006.01)
*G01K 7/22* (2006.01)
(Continued)

(52) U.S. Cl.
CPC ............. *G01K 7/226* (2013.01); *G01K 7/22* (2013.01); *H01C 7/008* (2013.01); *H01C 7/04* (2013.01)

(58) Field of Classification Search
CPC .......... G01K 7/226; G01K 7/22; H01C 7/008; H01C 7/04
See application file for complete search history.

(56) References Cited

U.S. PATENT DOCUMENTS

2003/0062984 A1*   4/2003   Ito ......................... H01C 7/008
338/25

FOREIGN PATENT DOCUMENTS

| CN | 1158163 A | 8/1997 |
|---|---|---|
| JP | 61147125 | 7/1986 |

(Continued)

OTHER PUBLICATIONS

Chinese Office Action dated Mar. 2, 2016 issued on corresponding Chinese Patent Application No. 201380011445.3 (5 pages).
(Continued)

*Primary Examiner* — Lisa Caputo
*Assistant Examiner* — Janice M Soto
(74) *Attorney, Agent, or Firm* — Locke Lord LLP

(57) ABSTRACT

Provided is a temperature sensor which does not easily cause a crack in a Ti—Al—N-based thermistor material layer when the film is bent, can be directly deposited on a film or the like without firing, and has a high reliability with a high heat resistance. The temperature sensor includes an insulating film 2, a thin film thermistor portion 3 made of a Ti—Al—N-based thermistor material formed on the insulating film, a pair of pattern electrodes 4 formed on the insulating film with a pair of opposed electrode portions 4a being arranged so as to be opposed to each other on the thin film thermistor portion, wherein the pair of opposed electrode portions covers the entire surface of thin film thermistor portion excluding the region between the opposed electrode portions.

3 Claims, 7 Drawing Sheets

(51) Int. Cl.
*H01C 7/04* (2006.01)
*H01C 7/00* (2006.01)

(56) References Cited

FOREIGN PATENT DOCUMENTS

| | | | |
|---|---|---|---|
| JP | 2004-319737 A | | 11/2004 |
| JP | 2004379737 | * | 11/2004 |
| JP | 2006078478 A | | 3/2006 |
| JP | 2006258520 A | | 9/2006 |
| JP | 2012067502 A | | 4/2012 |

OTHER PUBLICATIONS

International Search Report dated May 14, 2013 for PCT/JP2013/060137.

* cited by examiner (a)

(b)

TEMPERATURE SENSOR

CROSS-REFERENCE TO RELATED APPLICATIONS

This application is the national phase under 35 U.S.C. § 371 of PCT International Application No. PCT/JP2013/060137, filed Mar. 26, 2013, which claims the benefit of Japanese Patent Application No. 20120-081109 filed Mar. 30, 2012, the entire contents of the aforementioned applications are hereby incorporated herein by reference.

BACKGROUND OF THE INVENTION

Field of the Invention

The present invention relates to a temperature sensor that is a film type thermistor temperature sensor having an excellent bending resistance.

Description of the Related Art

There is a demand for a thermistor material used for a temperature sensor or the like having a high B constant in order to obtain a high precision and high sensitivity temperature sensor. Conventionally, transition metal oxides such as Mn, Co, Fe, and the like are typically used as such thermistor materials (see Patent Documents 1 and 2). These thermistor materials also need firing at a temperature of 600° C. or higher in order to obtain a stable thermistor characteristic/property.

In addition to thermistor materials consisting of metal oxides as described above, Patent Document 3 discloses a thermistor material consisting of a nitride represented by the general formula: $M_xA_yN_z$ (where "M" represents at least one of Ta, Nb, Cr, Ti, and Zr, "A" represents at least one of Al, Si, and B, $0.1 \leq x \leq 0.8$, $0 < y \leq 0.6$, $0.1 \leq z \leq 0.8$, and $x+y+z=1$). In Patent Document 3, only a Ta—Al—N-based material consisting of a nitride represented by the general formula: $M_xA_yN_z$ (where $0.5 \leq x \leq 0.8$, $0.1 \leq y \leq 0.5$, $0.2 \leq z \leq 0.7$, and $x+y+z=1$) is described as an Example. The Ta—Al—N-based material is produced by sputtering in a nitrogen gas-containing atmosphere using a material containing the element(s) listed above as a target. The resultant thin film is subject to a heat treatment at a temperature from 350 to 600° C. as required.

PRIOR ART DOCUMENTS

Patent Documents

[Patent Document 1] Japanese Patent Laid-Open No. 2003-226573
[Patent Document 2] Japanese Patent Laid-Open No. 2006-324520
[Patent Document 3] Japanese Patent Laid-Open No. 2004-319737

SUMMARY OF THE INVENTION

Problems to be Solved by the Invention

The following problems still remain in the conventional techniques described above.

In recent years, the development of a film type thermistor sensor made of a thermistor material formed on a resin film has been considered, and thus, it has been desired to develop a thermistor material that can be directly deposited on a film. Specifically, it is expected that a flexible thermistor sensor will be obtained by using a film. Furthermore, it is desired to develop a very thin thermistor sensor having a thickness of about 0.1 mm. However, a substrate material using a ceramic material such as alumina that has often been conventionally used has a problem that if the substrate material is thinned to a thickness of 0.1 mm for example, the substrate material is very fragile and breaks easily. Thus, it is expected that a very thin thermistor sensor will be obtained by using a film.

Conventionally, when a temperature sensor made of a nitride-based thermistor material consisting of Ti—Al—N is formed by stacking a thermistor material layer consisting of Ti—Al—N and an electrode on a film, the electrode layer made of Au or the like is deposited on the thermistor material layer, and the deposited film is patterned so as to have a comb shape or the like. However, when the film is bent, a crack easily occurs in a part of the thermistor material layer excluding the comb shaped electrode.

In addition, a film made of a resin material typically has a low heat resistance temperature of 150° C. or lower, and even polyimide, which is known as a material having a relatively high heat resistance temperature, only has a heat resistance to a temperature of about 200° C. Hence, when a heat treatment is performed in a process of forming a thermistor material, it has been conventionally difficult to use such a thermistor material. Therefore, since the above-described conventional oxide thermistor material needs to be fired at a temperature of 600° C. or higher in order to realize a desired thermistor characteristic, a film type thermistor sensor that is directly deposited on a film cannot be realized by such a thermistor material. Thus, it has been desired to develop a thermistor material that can be directly deposited on a film without firing. However, even the thermistor material disclosed in Patent Document 3 still needs a heat treatment on the resultant thin film at a temperature from 350 to 600° C. as required in order to obtain a desired thermistor characteristic. Regarding this thermistor material, a B constant of about 500 to 3000 K was obtained in an Example of the Ta—Al—N-based material, but the heat resistance of this material is not described and therefore, the thermal reliability of a nitride-based material is unknown.

The present invention has been made in view of the aforementioned circumstances, and an object of the present invention is to provide a temperature sensor having a Ti—Al—N-based thermistor material layer that does not easily cause a crack when a film is bent, can be directly deposited on a film or the like without firing, and has a high reliability with a high heat resistance.

Means for Solving the Problems

The present invention adopts the following configuration in order to overcome the aforementioned problems. Specifically, a temperature sensor according to a first aspect of the present invention is characterized by including an insulating film; a thin film thermistor portion made of a Ti—Al—N-based thermistor material formed on the insulating film; and a pair of pattern electrodes formed on the insulating film with a pair of opposed electrode portions being arranged so as to be opposed to each other on the thin film thermistor portion, wherein the pair of the opposed electrode portions covers the entire surface of the thin film thermistor portion excluding the region between the opposed electrode portions.

In this temperature sensor, since the pair of opposed electrode portions covers the entire surface of the thin film thermistor portion excluding the region between the opposed electrode portions, the opposed electrode portions protect the entire surface of the thin film thermistor portion, which can suppress the occurrence of a crack in the thin film thermistor portion even when the insulating film is bent.

A temperature sensor according to a second aspect of the present invention is characterized in that the pair of opposed electrode portions in the temperature sensor according to the first aspect of the present invention further covers the surroundings of the thin film thermistor portion.

Specifically, in this temperature sensor, since the pair of opposed electrode portions further covers the surroundings of the thin film thermistor portion, the occurrence of a crack in the thin film thermistor portion can be further suppressed when the insulating film is bent. In addition, since the edge of the thin film thermistor portion is pressed down by the pair of opposed electrode portions, its separation or the like can be suppressed.

A temperature sensor according to a third aspect of the present invention is characterized in that the thin film thermistor portion in the temperature sensor according to the first or second aspect of the present invention consists of a metal nitride represented by the general formula: $Ti_xAl_yN_z$ (where $0.70 \le y/(x+y) \le 0.95$, $0.4 \le z \le 0.5$, and $x+y+z=1$), wherein the crystal structure thereof is a hexagonal wurtzite-type single phase.

The present inventors' serious endeavor carried out by focusing on an Al—N-based material among nitride materials found that an Al—N-based material having a good B constant and an excellent heat resistance may be obtained without firing by substituting the Al site with a specific metal element for improving electric conductivity and by ordering it into a specific crystal structure even though Al—N is an insulator and difficult to provide with an optimum thermistor characteristic (B constant: about 1000 to 6000 K).

Therefore, the present invention has been made on the basis of the above finding that when the thin film thermistor portion consists of a metal nitride represented by the general formula: $Ti_xAl_yN_z$ (where $0.70 \le y/(x+y) \le 0.95$, $0.4 \le z \le 0.5$, and $x+y+z=1$), wherein the crystal structure thereof is a hexagonal wurtzite-type single phase, a good B constant and a high heat resistance can be obtained without firing.

Note that when the value of "y/(x+y)" (i.e., Al/(Ti+Al)) is less than 0.70, a wurtzite-type single phase cannot be obtained, but two coexisting phases of a wurtzite-type phase and a NaCl-type phase or a single phase of only a NaCl-type phase may be obtained. Consequently, a sufficiently high resistance and a high B constant cannot be obtained.

When the value of "y/(x+y)" (i.e., Al/(Ti+Al)) exceeds 0.95, the metal nitride material exhibits very high resistivity and extremely high electrical insulation. Therefore, such metal nitride material is not applicable as a thermistor material.

When the value of "z" (i.e., N/(Ti+Al+N)) is less than 0.4, the amount of nitrogen contained in the metal is too small to obtain a wurtzite-type single phase. Consequently, a sufficiently high resistance and a high B constant cannot be obtained.

Furthermore, when the value of "z" (i.e., N/(Ti+Al+N)) exceeds 0.5, a wurtzite-type single phase cannot be obtained. This is because the correct stoichiometric ratio of N/(Ti+Al+N) in a wurtzite-type single phase without defects at the nitrogen site is 0.5.

Effects of the Invention

According to the present invention, the following effects may be provided.

Specifically, since the temperature sensor according to the present invention, the pair of opposed electrode portions covers the entire surface of the thin film thermistor portion excluding the region between the opposed electrode portions, the occurrence of a crack can be suppressed in the thin film thermistor portion even when the insulating film is bent.

Furthermore, when the thin film thermistor portion is made of a metal nitride represented by the general formula: $Ti_xAl_yN_z$ (where $0.70 \le y/(x+y) \le 0.95$, $0.4 \le z \le 0.5$, and $x+y+z=1$), wherein the crystal structure thereof is a hexagonal wurtzite-type single phase, a good B constant and a high heat resistance can be obtained without firing.

Therefore, the temperature sensor according to the present invention does not easily cause a crack even when it is bent, is flexible, and has a smooth surface. Hence it can be inserted and installed into a narrow opening of a contactless power feeding apparatus, a battery, or the like, and can be placed on a curved surface.

DESCRIPTION OF THE EMBODIMENTS

Figure 1:
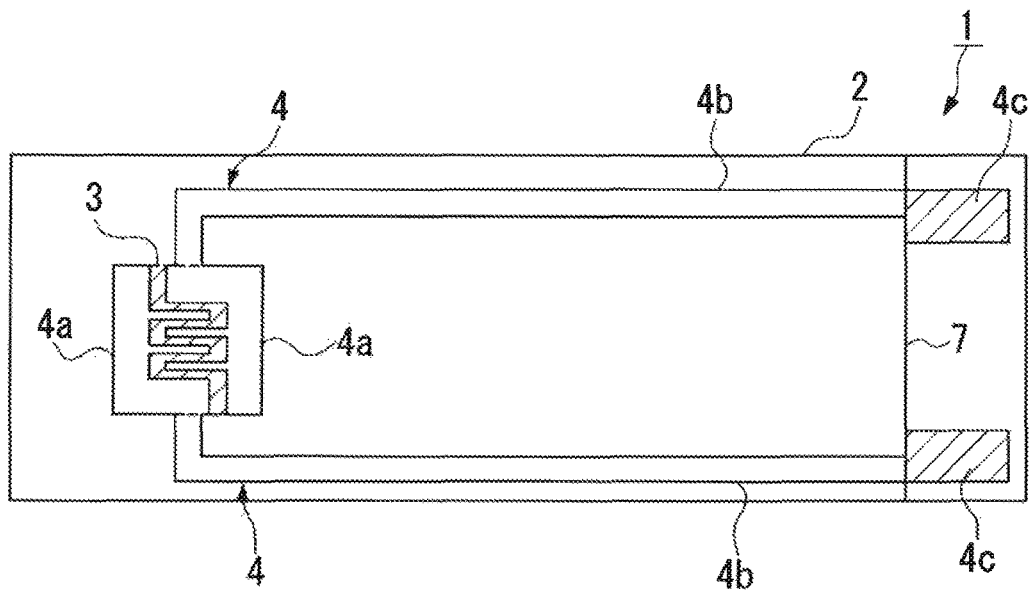
FIG. 1 is a plan view illustrating a temperature sensor according to a first embodiment of the present invention.

Hereinafter, a temperature sensor according to a first embodiment of the present invention will be described with reference to FIGS. 1 to 3. In the drawings used in the following description, the scale of each component is changed as appropriate so that each component is recognizable or is readily recognized.

A temperature sensor 1 of the present embodiment is a film type thermistor sensor including an insulating film 2; a thin film thermistor portion 3 made of a Ti—Al—N-based thermistor material formed on the insulating film 2; and a pair of pattern electrodes 4 formed on the insulating film 2 with a pair of opposed electrode portions 4a being arranged so as to be opposed to each other on the thin film thermistor portion 3, as shown in FIG. 1.

The pair of opposed electrode portions 4a covers the entire surface of the thin film thermistor portion 3 excluding the region between the opposed electrode portions.

The insulating film 2 is a polyimide resin sheet formed in a band shape having a thickness of 7.5 to 125 μm, for example. The insulating film 2 may be made of another material such as polyethylene terephthalate (PET), polyethylene naphthalate (PEN), or the like.

The thin film thermistor portion 3 is made of a Ti—Al—N-based thermistor material. In particular, the thin film thermistor portion 3 consists of a metal nitride represented by the general formula: $Ti_xAl_yN_z$ (where $0.70 \leq y/(x+y) \leq 0.95$, $0.4 \leq z \leq 0.5$, and $x+y+z=1$), wherein the crystal structure thereof is a hexagonal wurtzite-type single phase.

The pattern electrode 4 has a bonding layer of Cr or NiCr having a film thickness of 5 to 100 nm formed on the thin film thermistor portion 3, and an electrode layer made of a noble metal such as Au having a film thickness 50 to 1000 nm formed on the bonding layer.

The pair of pattern electrodes 4 has the pair of opposed electrode portions 4a that is a pair of comb shaped electrode portions having a comb shaped pattern that is arranged so as to be opposed to each other, and a pair of linear extending portions 4b extending with the tip ends thereof being connected to these comb shaped electrode portions 4a and the base ends thereof being arranged at the end of the insulating film 2.

A plating portion 4c such as Au plating is formed as a lead wire drawing portion on the base end of each of the pair of linear extending portions 4b. One end of the lead wire is joined with the plating portion 4c via a solder material or the like. Furthermore, except for the end of the insulating film 2 including the plating portions 4c, a polyimide coverlay film 7 is pressure bonded to the insulating film 2. Instead of the polyimide coverlay film 7, a polyimide or epoxy-based resin material may also be formed on the insulating film 2 by printing.

As described above, the thin film thermistor portion 3 is made of a metal nitride material consisting of a metal nitride represented by the general formula: $Ti_xAl_yN_z$ (where $0.70 \leq y/(x+y) \leq 0.95$, $0.4 \leq z \leq 0.5$, and $x+y+z=1$), wherein the crystal structure thereof is a hexagonal crystal system and a wurtzite-type (space group: $P6_3mc$ (No. 186)) single phase. Specifically, this metal nitride material consists of a metal nitride having a composition within the region enclosed by the points A, B, C, and D in the Ti—Al—N-based ternary phase diagram as shown in FIG. 2, wherein the crystal phase thereof is wurtzite-type.

Note that the composition ratios of (x, y, z) (at %) at the points A, B, C, and D are A (15, 35, 50), B (2.5, 47.5, 50), C(3, 57, 40), and D (18, 42, 40), respectively.

Also, the thin film thermistor portion 3 is deposited as a film having a film thickness of 100 to 1000 nm for example, and is a columnar crystal, extending in a vertical direction with respect to the surface of the film. Furthermore, it is preferable that the material of the thin film thermistor portion 3 is more strongly oriented along the c-axis than the a-axis in a vertical direction with respect to the surface of the film.

Note that the decision about whether the material of the thin film thermistor portion 3 has a strong a-axis orientation (100) or a strong c-axis orientation (002) in a vertical direction with respect to the surface of the film (film thickness direction) is determined by examining the orientation of the crystal axis using X-ray diffraction (XRD). When the peak intensity ratio of "the peak intensity of (100)"/"the peak intensity of (002)", where (100) is the Miller index indicating a-axis orientation and (002) is the Miller index indicating c-axis orientation, is less than 1, the material of the thin film thermistor portion 3 is determined to have a strong c-axis orientation.

Hereinafter, a method for producing the temperature sensor 1 will be described with reference to FIG. 3.

The method for producing the temperature sensor 1 of the present embodiment includes a step of forming a thin film thermistor portion for patterning the thin film thermistor portion 3 on the insulating film 2; and a step of forming electrodes for patterning the pair of electrodes 4 on the insulating film 2 with the pair of opposed electrode portions 4a being arranged on the thin film thermistor portion 3 so as to be opposed to each other.

A more specific example of the method for producing the temperature sensor 1 includes a step of pattern forming the thin film thermistor portion 3 of $Ti_xAl_yN_z$ (where x=9, y=43, and z=48) so as to have a film thickness of 200 nm and a predetermined shape on the insulating film 2 made of a polyimide film having a thickness of 50 μm by a reactive sputtering method using a metal mask in a nitrogen-containing atmosphere using a Ti—Al alloy sputtering target. The sputtering conditions at this time are as follows: an ultimate vacuum: $5 \times 10^{-6}$ Pa, a sputtering gas pressure: 0.4 Pa, a target input power (output): 300 W, and a nitrogen gas partial pressure under a mixed gas (Ar gas+nitrogen gas) atmosphere: 20%.

In this way, the thin film thermistor portion 3 is formed in a square shape having one side of 1.6 mm as shown in FIG. 3(a).

Then, a bonding layer of a Cr film having a film thickness of 20 nm is formed on the thin film thermistor portion 3 and the insulating film 2 by a sputtering method. Furthermore, an electrode layer of an Au film having a film thickness of 200 nm is formed on this bonding layer by a sputtering method.

Next, a resist solution was coated on the deposited electrode layer using a spin coater, and then pre-baking was performed for 1.5 minutes at a temperature of 110° C. After being exposed by an exposure device, any unnecessary portion was removed by a developing solution, and then patterning was performed by post-baking for 5 minutes at a temperature of 150° C. Then, any unnecessary electrode portion was subject to wet etching using commercially available Au etchant and Cr etchant in that order, and then the resist was stripped so as to form the pair of pattern electrodes 4 as desired, as shown in FIG. 3(b). At this time, the pair of opposed electrode portions 4a is patterned so as to cover the entire surface of the thin film thermistor portion 3 with the pair of opposed electrode portions 4a together forming its contour in a substantially square shape having one side of 1.0 to 1.9 mm and with the thin film thermistor portion 3 being arranged at the center.

Next, as shown in FIG. 3(c), the polyimide coverlay film 7 with an adhesive having a thickness of 20 μm, for example, is placed on the insulating film 2, and then bonded to each other under pressurization of 2 MPa at a temperature of 150° C. for 10 minutes using a press machine. Furthermore, as shown in FIG. 1, an Au thin film having a thickness of 2 μm, for example, is formed at the base ends of the linear extending portions 4b using an Au plating solution so as to form the plating portions 4c.

When a plurality of temperature sensors 1 is simultaneously produced, a plurality of thin film thermistor portions 3 and a plurality of pattern electrodes 4 are formed on a large-format sheet of the insulating film 2 as described above, and then, the resulting large-format sheet is cut into a plurality of segments so as to obtain a plurality of temperature sensors 1.

In this way, the temperature sensor 1 that is a thin film type thermistor sensor having a size of 16×4.0 mm and a thickness of 0.10 mm, for example, is obtained.

As described above, since in the temperature sensor 1 of the present embodiment, the pair of opposed electrode portions 4a covers the entire surface of the thin film thermistor portion 3 excluding the region between the opposed electrode portions, the opposed electrode portions 4a protects the entire surface of the thin film thermistor portion 3, which can suppress the occurrence of a crack in the thin film thermistor portion 3 even when the insulating film 2 is bent.

In addition, since the thin film thermistor portion 3 consists of a metal nitride represented by the general formula: $Ti_xAl_yN_z$ (where $0.70 \leq y/(x+y) \leq 0.95$, $0.4 \leq z \leq 0.5$, and $x+y+z=1$), wherein the crystal structure thereof is a hexagonal crystal system and a wurtzite-type single phase, a good B constant and a high heat resistance can be obtained without firing.

In addition, since this metal nitride material is a columnar crystal extending in a vertical direction with respect to the surface of the film, the crystallinity of the film is high. Consequently, a high heat resistance can be obtained.

Furthermore, since this metal nitride material is more strongly oriented along the c-axis than the a-axis in a vertical direction with respect to the surface of the film, a high B constant as compared with the case of a strong a-axis orientation can be obtained.

Note that since, in the method for producing the thermistor material layer (the thin film thermistor portion 3) of the present embodiment, film deposition is performed by reactive sputtering in a nitrogen-containing atmosphere using a Ti—Al alloy sputtering target, the metal nitride material consisting of Ti—Al—N can be deposited on a film without firing.

In addition, since a sputtering gas pressure during the reactive sputtering is set to less than 0.67 Pa, a film made of the metal nitride material, which is more strongly oriented along the c-axis than the a-axis in a vertical direction to the surface of the film, can be formed.

Thus, since, in the temperature sensor 1 of the present embodiment, the thin film thermistor portion 3 made of the above-described thermistor material layer is formed on the insulating film 2, the insulating film 2 having a low heat resistance, such as a resin film, can be used because the thin film thermistor portion 3 is formed without firing and has a high B constant and a high heat resistance. Consequently, a thin and flexible thermistor sensor having a good thermistor characteristic can be obtained.

In addition, a substrate material employing a ceramic such as alumina that has often been conventionally used has a problem that if the substrate material is thinned to a thickness of 0.1 mm for example, the substrate material is very fragile and breaks easily. On the other hand, since a film can be used in the present invention, a very thin film type thermistor sensor having a thickness of 0.1 mm, for example, can be obtained as described above.

Figure 4:
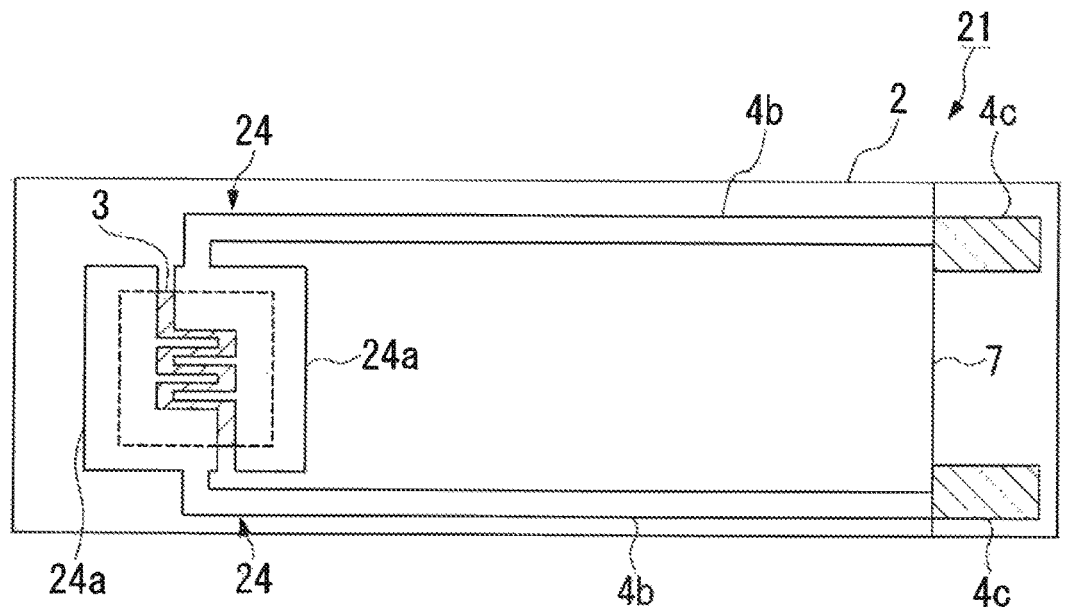
FIG. 4 is a plan view illustrating a temperature sensor according to a second embodiment of the present invention.

Next, a temperature sensor according to a second embodiment of the present invention will be described with reference to FIG. 4. Note that, in the following description of the second embodiment, the same components as those in the above-described embodiment are denoted by the same reference numerals, and thus the description thereof is omitted.

The second embodiment is different from the first embodiment in the following point. In the first embodiment, the contour of the pair of opposed electrode portions 4a corresponds to that of the thin film thermistor portion 3, that is, it is dimensioned to be the same size as that of the thin film thermistor portion 3. On the other hand, in the temperature sensor 21 of the second embodiment, a pair of opposed electrode portions 24a further covers the surroundings of the thin film thermistor portion 3 as shown in FIG. 4.

Specifically, in the second embodiment, the pair of opposed electrode portions 24a of a pair of pattern electrodes 24 together forms its contour in a square shape larger than that of the thin film thermistor portion 3, covers the thin film thermistor portion 3 with the thin film thermistor portion 3 being arranged at the center, and further covers the broad portion protruding from the circumference of the thin film thermistor portion 3.

Thus, since, in the temperature sensor 21 of the second embodiment, the pair of opposed electrode portions 24a further covers the surroundings of the thin film thermistor portion 3, the occurrence of a crack in the thin film thermistor portion 3 can be further suppressed when the insulating film 2 is bent. In addition, since the edge of the thin film thermistor portion 3 is pressed down by the pair of opposed electrode portions 24a, its separation or the like can be suppressed.

EXAMPLES

Next, the evaluation results in Examples of the temperature sensor according to the present invention produced based on the above embodiments will be specifically described with reference to FIGS. 5 to 13.

<Bending Test>

A bending test was performed on temperature sensors of Examples 1 and 2 for bending, which were produced based on the first and second embodiments, by bending them into concave and convex shapes with a curvature radius of 6 mm alternately 100 times each. After the test, the thin film thermistor portions were observed and confirmed whether or not there was a crack therein. Note that a crack in the thin film thermistor portions was confirmed from the insulating film side. In addition, the electric properties change before and after the test was also evaluated at the same time. These evaluation results are shown in Table 1.

In addition, a temperature sensor, in which the contour of the pair of opposed electrode portions is smaller than that of the thin film thermistor portion, was produced as Comparative Example 1 for bending for comparison and evaluated in the same manner. The dimensions of each thin film thermistor portion and a pair of opposed electrode portions are shown in Table 1.

From these results, it can be confirmed that a crack occurred when the contour of the pair of opposed electrode portions was smaller than that of the thin film thermistor portion in Comparative Example 1 for bending, while a crack did not occur in both Examples 1 and 2 for bending of the present invention, showing that the thin film thermistor portion was protected by the opposed electrode portions.

In addition, the change rate of a resistance value was 1.60% and the change rate of a B constant was 1.10% in Comparative Example 1 for bending, while the change rates of a resistance value were 0.40% and 0.10%, and the change rates of a B constant were 0.70% and 0.20% in Examples 1 and 2 for bending that have no crack, respectively. Thus it can be confirmed that the temperature sensors of Examples 1 and 2 have an excellent bendability because the changes of both electric properties were small.

of $Ti_xAl_yN_z$ outside the range of the present invention and have different crystal systems, were similarly produced for comparative evaluation.

<Film Evaluation>

(1) Composition Analysis

Elemental analysis was performed on the thin film thermistor portions 3 obtained by the reactive sputtering method by X-ray photoelectron spectroscopy (XPS). In the XPS, a quantitative analysis was performed on a sputtering surface at a depth of 20 nm from the outermost surface by Ar sputtering. The results are shown in Table 2. In the following tables, the composition ratios are expressed by "at %".

In the X-ray photoelectron spectroscopy (XPS), a quantitative analysis was performed under the conditions of an X-ray source of MgKα (350 W), a path energy of 58.5 eV, a measurement interval of 0.125 eV, a photo-electron take-

TABLE 1

| | ELEMENT STRUCTURE | | RESULT OF BENDING TEST | | |
|---|---|---|---|---|---|
| | LENGTH OF ONE SIDE OF ELECTRODE PORTION | LENGTH OF ONE SIDE OF THERMISTOR PORTION | OCCURRENCE OF CRACK | CHANGE RATE OF RESISTANCE VALUE | CHANGE RATE OF B CONSTANT |
| COMPARATIVE EXAMPLE 1 FOR BENDING | 1.0 mm | 1.6 mm | YES | 1.60% | 1.10% |
| EXAMPLE 1 FOR BENDING | 1.6 mm | 1.6 mm | NO | 0.40% | 0.70% |
| EXAMPLE 2 FOR BENDING | 1.9 mm | 1.6 mm | NO | 0.10% | 0.20% |

<Production of Film Evaluation Element>

Figure 5:
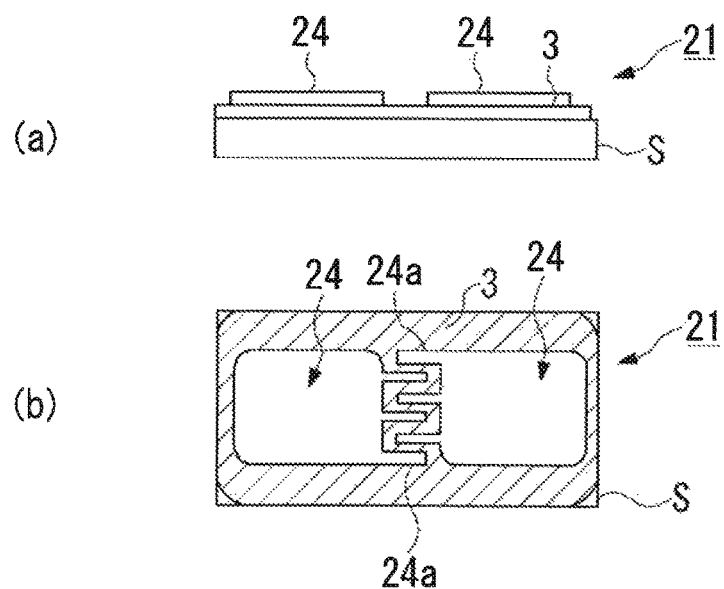
FIG. 5 is a front view and a plan view illustrating a film evaluation element made of a metal nitride material for a thermistor used in a temperature sensor according to an Example of the present invention.

The film evaluation elements 21 shown in FIG. 5 were produced as Examples and Comparative Examples in order to evaluate the thermistor material layer (the thin film thermistor portion 3) of the present invention.

Firstly, each of the thin film thermistor portions 3 having a thickness of 500 nm, which were made of the metal nitride materials with various composition ratios shown in Table 2, was formed on an Si wafer with a thermal oxidation film as an Si substrate S by using Ti—Al alloy targets with various composition ratios by a reactive sputtering method. The thin film thermistor portions 3 were formed under the sputtering conditions of an ultimate vacuum of $5 \times 10^{-6}$ Pa, a sputtering gas pressure of from 0.1 to 1 Pa, a target input power (output) of from 100 to 500 W, and a nitrogen gas partial pressure under a mixed gas (Ar gas+nitrogen gas) atmosphere of from 10 to 100%.

Next, a Cr film having a thickness of 20 nm was formed and an Au film having a thickness of 100 nm was further formed on each of the thin film thermistor portions 3 by a sputtering method. Furthermore, a resist solution was coated on the stacked metal films using a spin coater, and then pre-baking was performed for 1.5 minutes at a temperature of 110° C. After being exposed by an exposure device, any unnecessary portion was removed by a developing solution, and then patterning was performed by post-baking for 5 minutes at a temperature of 150° C. Then, any unnecessary electrode portion was subject to wet etching using commercially available Au etchant and Cr etchant, and then the resist was stripped so as to form the pair of pattern electrodes 24, each having the desired comb shaped electrode portion 24a. Then, the resultant elements were diced into chip elements so as to obtain film evaluation elements 21 used for evaluating a B constant and for testing heat resistance.

Note that the film evaluation elements 21 according to Comparative Examples, which have the composition ratios off angle with respect to a sample surface of 45 degrees, and an analysis area of about 800 μmφ. Note that the quantitative accuracy of N/(Ti+Al+N) and Al/(Ti+Al) was ±2% and ±1%, respectively.

(2) Specific Resistance Measurement

The specific resistance of each of the thin film thermistor portions 3 obtained by the reactive sputtering method was measured by the four-probe method at a temperature of 25° C. The results are shown in Table 2.

(3) Measurement of B Constant

The resistance values for each of the film evaluation elements 21 at temperatures of 25° C. and 50° C. were measured in a constant temperature bath, and a B constant was calculated based on the resistance values at temperatures of 25° C. and 50° C. The results are shown in Table 2.

In the B constant calculating method of the present invention, a B constant is calculated by the following formula using the resistance values at temperatures of 25° C. and 50° C. as described above.

B constant (K)=ln(R25/R50)/(1/T25−1/T50)

R25 (Ω): resistance value at 25° C.

R50 (Ω): resistance value at 50° C.

Figure 2:
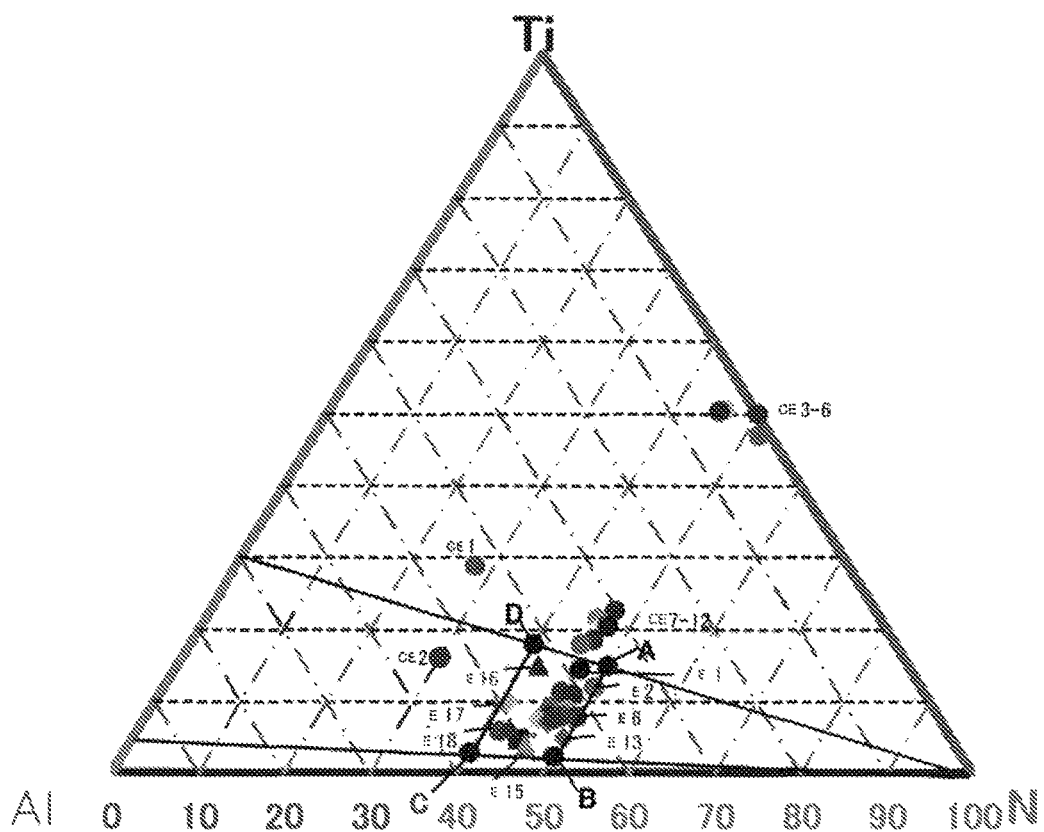
FIG. 2 is a Ti—Al—N-based ternary phase diagram illustrating the composition range of a metal nitride material for a thermistor according to a first embodiment.
Figure 3:
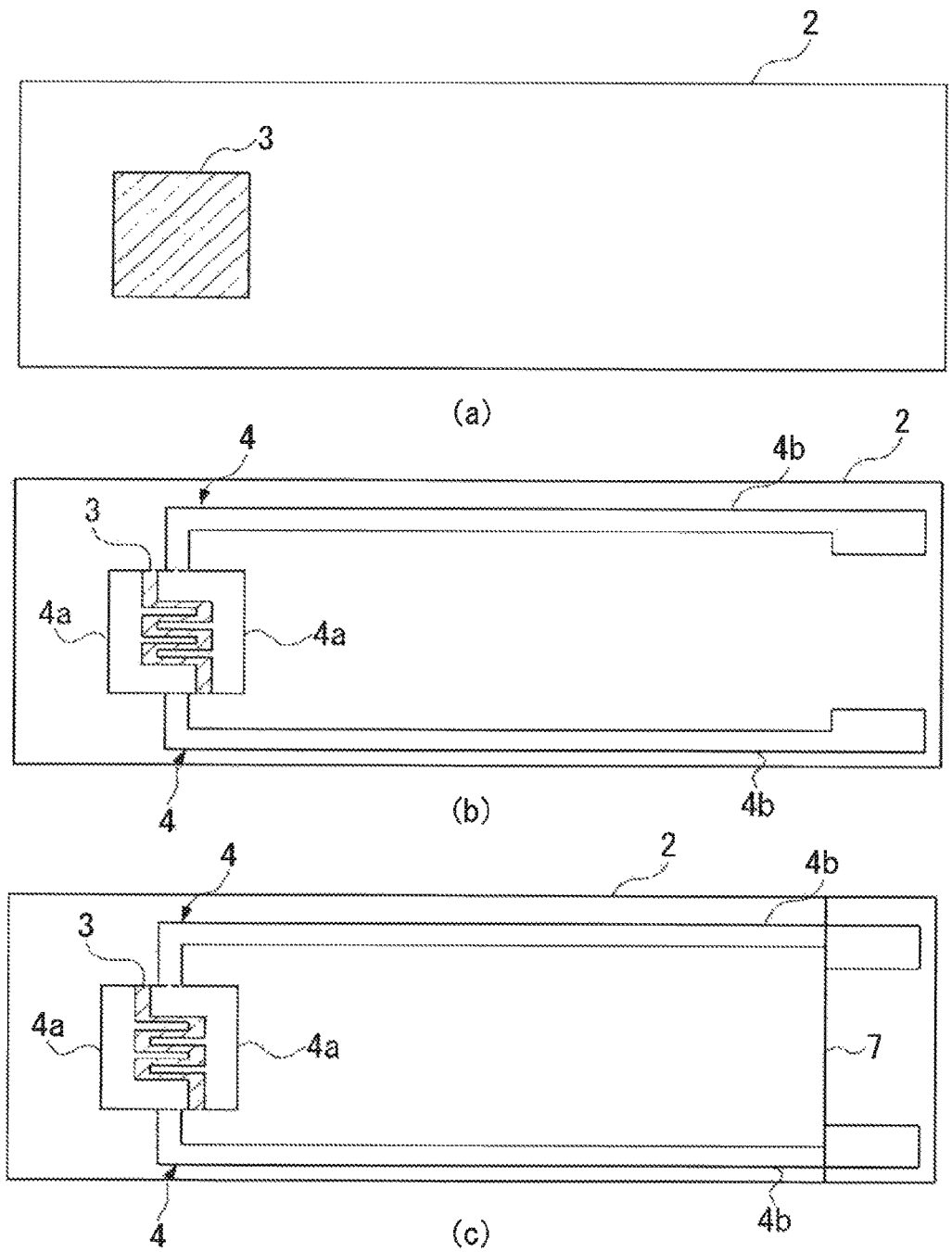
FIG. 3 is a plan view illustrating a method for producing a temperature sensor in the order of the steps according to a first embodiment.

T25 (K): 298.15 K, which is an absolute temperature of 25° C. expressed in Kelvin T50 (K): 323.15 K, which is an absolute temperature of 50° C. expressed in Kelvin As can be seen from these results, a thermistor characteristic of a resistivity of 100 Ωcm or higher and a B constant of 1500 K or higher is achieved in all of the Examples in which the composition ratios of $Ti_xAl_yN_z$ fall within the region enclosed by the points A, B, C, and D in the ternary phase diagram shown in FIG. 2, i.e., the region where "0.70≤y/(x+y)≤0.95, 0.4≤z≤0.5, and x+y+z=1".

Figure 6:
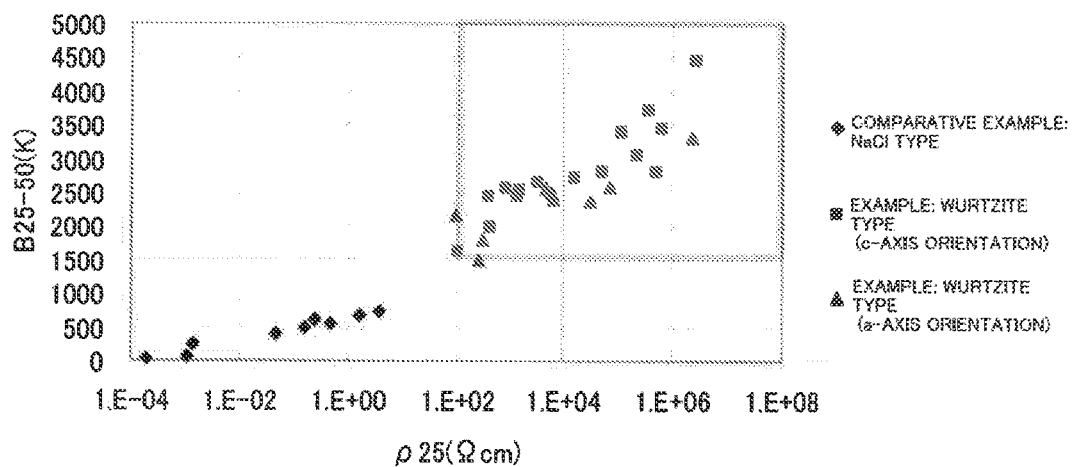
FIG. 6 is a graph illustrating the relationship between a resistivity at 25° C. and a B constant regarding the materials according to Examples and a Comparative Example of the present invention.
Figure 7:
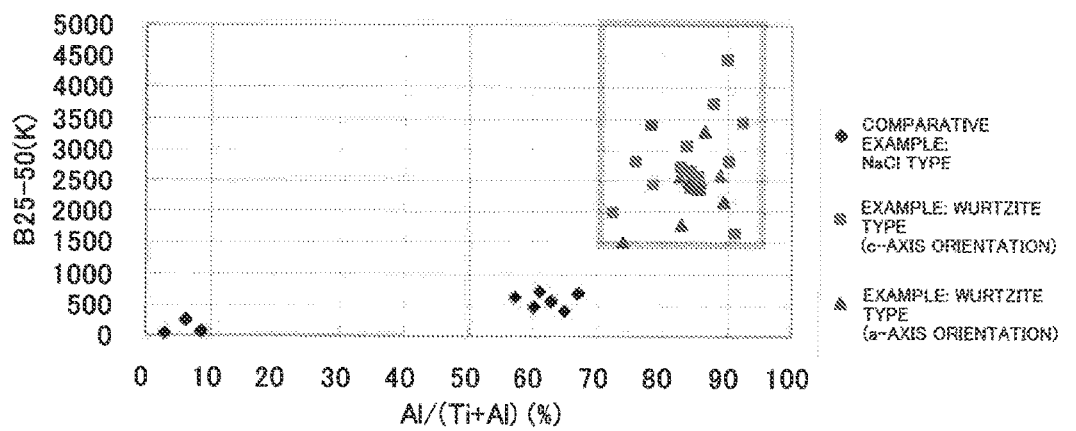
FIG. 7 is a graph illustrating the relationship between an Al/(Ti+Al) ratio and a B constant regarding the materials according to Examples and a Comparative Example of the present invention.

A graph illustrating the relationship between a resistivity at 25° C. and a B constant obtained from the above results is shown in FIG. 6. In addition, a graph illustrating the relationship between an Al/(Ti+Al) ratio and a B constant is shown in FIG. 7. These graphs shows that the materials of the film evaluation elements 21, the composition ratios of which fall within the region where Al/(Ti+Al) is from 0.7 to 0.95 and N/(Ti+Al+N) is from 0.4 to 0.5 and each crystal system of which is a hexagonal wurtzite-type single phase, have a specific resistance value at a temperature of 25° C. of 100 Ωcm or higher and a B constant of 1500 K or higher, which are the regions realizing a high resistance and a high B constant. Note that, in data shown in FIG. 7, the reason why the B constant varies with respect to nearly the same Al/(Ti+Al) ratio is because the materials of the film evaluation elements 21 have different amounts of nitrogen in their crystals.

In the materials according to Comparative Examples 3 to 12 shown in Table 2, the composition ratios fall within the region where Al/(Ti+Al)<0.7, and each crystal system thereof is a cubic NaCl-type phase. In addition, in the material according to Comparative Example 12 (Al/(Ti+Al)=0.67), a NaCl-type phase and a wurtzite-type phase coexist. Thus, a material with the composition ratio that falls within the region where Al/(Ti+Al)<0.7 has a specific resistance value at a temperature of 25° C. of less than 100 Ωcm and a B constant of less than 1500 K, which are the regions of low resistance and low B constant.

In the materials according to Comparative Examples 1 and 2 shown in Table 2, the composition ratios fall within the region where N/(Ti+Al+N) is less than 40%, that is, the materials are in a crystal state where nitridation of metals contained therein is insufficient. The materials according to Comparative Example 1 and 2 were neither a NaCl-type nor wurtzite-type phase and had very poor crystallinity. In addition, it was found that the materials according to these Comparative Examples exhibited near-metallic behavior because both the B constant and the resistance value were very small.

(4) Thin Film X-Ray Diffraction (Identification of Crystal Phase)

The crystal phases of the thin film thermistor portions 3 obtained by the reactive sputtering method were identified by Grazing Incidence X-ray Diffraction. The thin film X-ray diffraction is a small angle X-ray diffraction experiment. The measurement was performed under the conditions of a vessel of Cu, an incidence angle of 1 degree, and 2θ of from 20 to 130 degrees. Some of the samples were measured under the condition of an incidence angle of 0 degree and 2θ of from 20 to 100 degrees.

As a result of the measurement, a wurtzite-type phase (hexagonal, the same phase as that of Al—N) was obtained in the region where Al/(Ti+Al)≥0.7, whereas a NaCl-type phase (cubic, the same phase as that of Ti—N) was obtained in the region where Al/(Ti+Al)<0.65. In addition, two coexisting phases of a wurtzite-type phase and a NaCl-type phase were obtained in the region where 0.65<Al/(Ti+Al)<0.7.

Thus, in the Ti—Al—N-based material, the regions of high resistance and high B constant can be realized by the wurtzite-type phase having a composition ratio of Al/(Ti+Al)≥0.7. In the Examples of the present invention, no impurity phase was confirmed and each crystal structure thereof was a wurtzite-type single phase.

In Comparative Examples 1 and 2 shown in Table 2, each crystal phase thereof was neither a wurtzite-type nor NaCl-type phase as described above, and thus, could not be identified in the testing. In these Comparative Examples, the peak width of XRD was very large, showing that the materials had very poor crystallinity. It is contemplated that the crystal phases thereof were metal phases with insufficient nitridation because they exhibited near-metallic behavior from the viewpoint of electric properties.

TABLE 2

| | CRYSTAL SYSTEM | XRD PEAK INTENSITY RATIO OF (100)/(002) WHEN CRYSTAL PHASE IS WURTZITE TYPE PHASE | CRYSTAL AXIS EXHIBITING STRONG DEGREE OF ORIENTATION IN VERTICAL DIRECTION TO SUBSTRATE SURFACE WHEN CRYSTAL PHASE IS WURTZITE TYPE PHASE (a-AXIS OR c-AXIS) | SPUTTERING GAS PRESSURE (Pa) | COMPOSITION RATIO | | | | RESULT OF ELECTRIC PROPERTIES | |
|---|---|---|---|---|---|---|---|---|---|---|
| | | | | | Ti (%) | Al (%) | N (%) | Al/(Ti+Al) (%) | B CONSTANT (K) | SPECIFIC RESISTANCE VALUE AT 25° C. (Ω cm) |
| COMPARATIVE EXAMPLE 1 | UNKNOWN INSUFFICIENT NITRIDATION | — | | — | 29 | 43 | 28 | 60 | <0 | 2.E−04 |
| COMPARATIVE EXAMPLE 2 | UNKNOWN INSUFFICIENT NITRIDATION | — | | — | 16 | 54 | 30 | 77 | 25 | 4.E−04 |
| COMPARATIVE EXAMPLE 3 | NaCl TYPE | — | | — | 50 | 0 | 50 | 0 | <0 | 2.E−05 |

TABLE 2-continued

| | CRYSTAL SYSTEM | XRD PEAK INTENSITY RATIO OF (100)/(002) WHEN CRYSTAL PHASE IS WURTZRITE TYPE PHASE | CRYSTAL AXIS EXHIBITING STRONG DEGREE OF ORIENTATION IN VERTICAL DIRECTION TO SUBSTRATE SURFACE WHEN CRYSTAL PHASE IS WURTZRITE TYPE PHASE (a-AXIS OR c-AXIS) | SPUTTERING GAS PRESSURE (Pa) | COMPOSITION RATIO | | | | B CONSTANT (K) | SPECIFIC RESISTANCE VALUE AT 25° C. (Ω cm) |
|---|---|---|---|---|---|---|---|---|---|---|
| | | | | | Ti (%) | Al (%) | N (%) | Al/(Ti + Al) (%) | | |
| COMPARATIVE EXAMPLE 4 | NaCl TYPE | — | — | — | 47 | 1 | 52 | 3 | 30 | 2.E−04 |
| COMPARATIVE EXAMPLE 5 | NaCl TYPE | — | — | — | 51 | 3 | 46 | 6 | 248 | 1.E−03 |
| COMPARATIVE EXAMPLE 6 | NaCl TYPE | — | — | — | 50 | 5 | 45 | 9 | 89 | 1.E−03 |
| COMPARATIVE EXAMPLE 7 | NaCl TYPE | — | — | — | 23 | 30 | 47 | 57 | 622 | 3.E−01 |
| COMPARATIVE EXAMPLE 8 | NaCl TYPE | — | — | — | 22 | 33 | 45 | 60 | 477 | 2.E−01 |
| COMPARATIVE EXAMPLE 9 | NaCl TYPE | — | — | — | 21 | 32 | 47 | 61 | 724 | 4.E+00 |
| COMPARATIVE EXAMPLE 10 | NaCl TYPE | — | — | — | 20 | 34 | 46 | 63 | 564 | 5.E−01 |
| COMPARATIVE EXAMPLE 11 | NaCl TYPE | — | — | — | 19 | 35 | 46 | 65 | 402 | 5.E−02 |
| COMPARATIVE EXAMPLE 12 | NaCl TYPE + WURTZITE TYPE | — | — | — | 18 | 37 | 45 | 67 | 685 | 2.E+00 |
| EXAMPLE 1 | WURTZITE TYPE | 0.05 | c-AXIS | <0.67 | 15 | 38 | 47 | 72 | 1980 | 4.E+02 |
| EXAMPLE 2 | WURTZITE TYPE | 0.07 | c-AXIS | <0.67 | 12 | 38 | 50 | 76 | 2798 | 5.E+04 |
| EXAMPLE 3 | WURTZITE TYPE | 0.45 | c-AXIS | <0.67 | 11 | 42 | 47 | 79 | 3385 | 1.E+05 |
| EXAMPLE 4 | WURTZITE TYPE | <0.01 | c-AXIS | <0.67 | 11 | 41 | 46 | 79 | 2437 | 4.E+02 |
| EXAMPLE 5 | WURTZITE TYPE | 0.34 | c-AXIS | <0.67 | 9 | 43 | 46 | 83 | 2727 | 2.E+04 |
| EXAMPLE 6 | WURTZITE TYPE | <0.01 | c-AXIS | <0.67 | 8 | 42 | 50 | 84 | 3057 | 2.E+05 |
| EXAMPLE 7 | WURTZITE TYPE | 0.09 | c-AXIS | <0.67 | 8 | 44 | 46 | 84 | 2665 | 3.E+03 |
| EXAMPLE 8 | WURTZITE TYPE | 0.05 | c-AXIS | <0.67 | 8 | 44 | 46 | 85 | 2527 | 1.E+03 |
| EXAMPLE 9 | WURTZITE TYPE | <0.01 | c-AXIS | <0.67 | 8 | 45 | 47 | 86 | 2557 | 8.E+02 |
| EXAMPLE 10 | WURTZITE TYPE | 0.04 | c-AXIS | <0.67 | 7 | 46 | 46 | 86 | 2449 | 1.E+03 |
| EXAMPLE 11 | WURTZITE TYPE | 0.24 | c-AXIS | <0.67 | 7 | 48 | 45 | 88 | 3729 | 4.E+05 |
| EXAMPLE 12 | WURTZITE TYPE | 0.73 | c-AXIS | <0.67 | 5 | 49 | 46 | 90 | 2798 | 5.E+05 |
| EXAMPLE 13 | WURTZITE TYPE | <0.01 | c-AXIS | <0.67 | 5 | 45 | 50 | 90 | 4449 | 3.E+06 |

TABLE 2-continued

| | CRYSTAL SYSTEM | XRD PEAK INTENSITY RATIO OF (100)/(002) WHEN CRYSTAL PHASE IS WURTZRITE TYPE PHASE | CRYSTAL AXIS EXHIBITING STRONG DEGREE OF ORIENTATION IN VERTICAL DIRECTION TO SUBSTRATE SURFACE WHEN CRYSTAL PHASE IS WURTZRITE TYPE PHASE (a-AXIS OR c-AXIS) | SPUTTERING GAS PRESSURE (Pa) | COMPOSITION RATIO | | | | B CONSTANT (K) | RESULT OF ELECTRIC PROPERTIES SPECIFIC RESISTANCE VALUE AT 25° C. (Ω cm) |
|---|---|---|---|---|---|---|---|---|---|---|
| | | | | | Ti (%) | Al (%) | N (%) | Al/(Ti + Al) (%) | | |
| EXAMPLE 14 | WURTZITE TYPE | 0.38 | c-AXIS | <0.67 | 5 | 50 | 45 | 91 | 1621 | 1.E+02 |
| EXAMPLE 15 | WURTZITE TYPE | 0.13 | c-AXIS | <0.67 | 4 | 50 | 46 | 93 | 3439 | 6.E+05 |
| EXAMPLE 16 | WURTZITE TYPE | 3.54 | a-AXIS | ≥0.67 | 15 | 43 | 42 | 74 | 1507 | 3.E+02 |
| EXAMPLE 17 | WURTZITE TYPE | 2.94 | a-AXIS | ≥0.67 | 10 | 49 | 41 | 83 | 1794 | 3.E+02 |
| EXAMPLE 18 | WURTZITE TYPE | 1.05 | a-AXIS | ≥0.67 | 6 | 52 | 42 | 90 | 2164 | 1.E+02 |
| EXAMPLE 19 | WURTZITE TYPE | 2.50 | a-AXIS | ≥0.67 | 9 | 44 | 47 | 83 | 2571 | 5.E+03 |
| EXAMPLE 20 | WURTZITE TYPE | 9.09 | a-AXIS | ≥0.67 | 8 | 46 | 46 | 84 | 2501 | 6.E+03 |
| EXAMPLE 21 | WURTZITE TYPE | 6.87 | a-AXIS | ≥0.67 | 8 | 45 | 47 | 84 | 2408 | 7.E+03 |
| EXAMPLE 22 | WURTZITE TYPE | 2.22 | a-AXIS | ≥0.67 | 8 | 46 | 46 | 86 | 2364 | 3.E+04 |
| EXAMPLE 23 | WURTZITE TYPE | 1.21 | a-AXIS | ≥0.67 | 7 | 46 | 47 | 87 | 3317 | 2.E+06 |
| EXAMPLE 24 | WURTZITE TYPE | 3.33 | a-AXIS | ≥0.67 | 6 | 51 | 43 | 89 | 2599 | 7.E+04 |

Next, since all the materials according to the Examples of the present invention were wurtzite-type phase films having strong orientation, whether the films have a strong a-axis orientation or c-axis orientation of the crystal axis in a vertical direction (film thickness direction) with respect to the Si substrate S was examined by XRD. At this time, in order to examine the orientation of the crystal axis, the peak intensity ratio of (100)(002) was measured, where (100) is the Miller index indicating a-axis orientation and (002) is the Miller index indicating c-axis orientation.

Consequently, in the Examples in which film deposition was performed at a sputtering gas pressure of less than 0.67 Pa, the intensity of (002) was much stronger than that of (100), that is, the films exhibited stronger c-axis orientation than a-axis orientation. On the other hand, in the Examples in which film deposition was performed at a sputtering gas pressure of 0.67 Pa or higher, the intensity of (100) was much stronger than that of (002), that is, the films exhibited stronger a-axis orientation than c-axis orientation.

Note that it was confirmed that a wurtzite-type single phase was formed in the same manner even when the thin film thermistor portion 3 was deposited on a polyimide film under the same deposition condition. It was also confirmed that the crystal orientation did not change even when the thin film thermistor portion 3 was deposited on a polyimide film under the same deposition condition.

Figure 8:
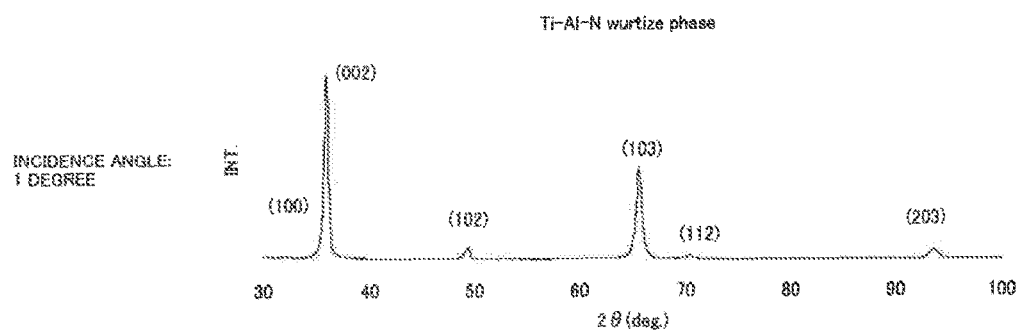
FIG. 8 is a graph illustrating the result of X-ray diffraction (XRD) performed on a material according to the Example of the present invention having a strong c-axis orientation and an Al/(Ti+Al) ratio of 0.84.

An exemplary XRD profile of the material according to the Example exhibiting strong c-axis orientation is shown in FIG. 8. In this Example, Al/(Ti+Al) was equal to 0.84 (wurtzite-type, hexagonal), and the measurement was performed at an incidence angle of 1 degree. As can be seen from the result, the intensity (100) was much stronger than that of (002) in this Example.

Figure 9:
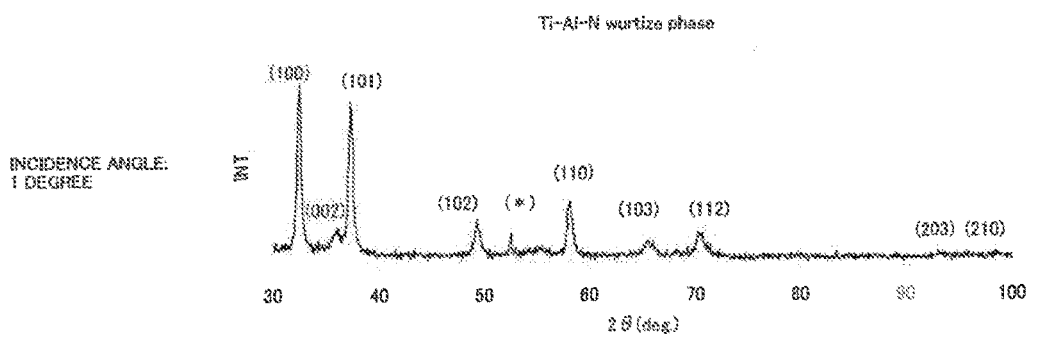
FIG. 9 is a graph illustrating the result of X-ray diffraction (XRD) performed on a material according to the Example of the present invention having a strong a-axis orientation and an Al/(Ti+Al) ratio of 0.83.
Figure 9:
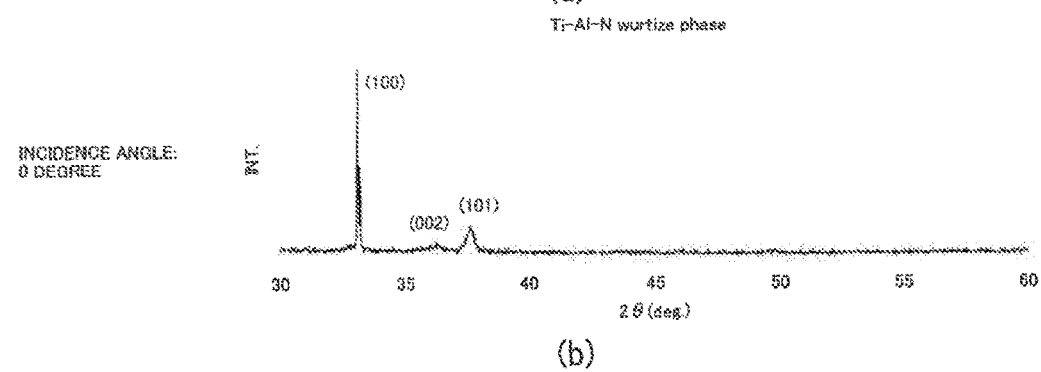

In addition, an exemplary XRD profile of the material according to the Example exhibiting strong a-axis orientation is shown in FIG. 9. In this Example, Al/(Ti+Ai) was equal to 0.83 (wurtzite-type, hexagonal), the measurement was performed at an incidence angle of 1 degree. As can be seen from the result, the intensity of (100) was much stronger than that of (002) in this Example.

Furthermore, in this Example, the symmetrical measurement was performed at an incidence angle of 0 degree. It was confirmed that the peak with the asterisk (*) in the graph was a peak originating from the device, and thus, the peak with the asterisk (*) in the graph was neither a peak originating from a sample itself nor a peak originating from an impurity phase (which could also be confirmed from the fact that the peak with (*) was lost in the symmetrical measurement).

Figure 10:
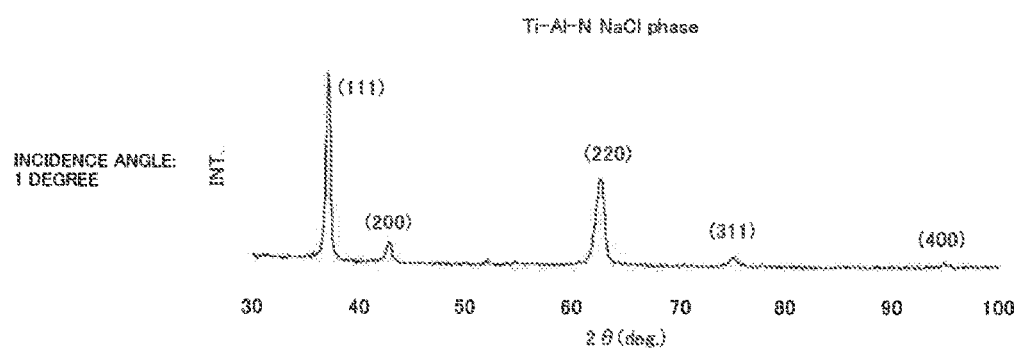
FIG. 10 is a graph illustrating the result of X-ray diffraction (XRD) performed on a material according to the Comparative Example of the present invention having an Al/(Ti+Al) ration of 0.60.

An exemplary XRD profile of the material according to a Comparative Example is shown in FIG. 10. In this Comparative Example, Al/(Ti+Al) was equal to 0.6 (NaCl type, cubic), and the measurement was performed at an incidence a c-axis in a vertical direction with respect to the surface of the substrate and that of other materials (Examples 19, 20, and 21) is strongly oriented along an a-axis in a vertical direction with respect to the surface of the substrate among the materials having nearly the same Al/(Ti+Al) ratio.

When both groups were compared to each other, it was found that the materials having a strong c-axis orientation had a higher B constant by about 100 K than that of the materials having a strong a-axis orientation provided that they have nearly the same Al/(Ti+Al) ratio. When focus was placed on the amount of N (N/(Ti+Al+N)), it was found that the materials having a strong c-axis orientation had a slightly larger amount of nitrogen than that of the materials having a strong a-axis orientation. Since the ideal stoichiometric ratio of N/(Ti+Al+N) is 0.5, it was found that the materials having a strong c-axis orientation were ideal materials due to a small amount of nitrogen defects.

TABLE 3

| | CRYSTAL SYSTEM | CRYSTAL PHASE IS | XRD PEAK INTENSITY RATIO OF (100)/1000) WHEN CRYSTAL PHASE IS WURTZITE TYPE | CRYSTAL AXIS EXHIBITING STRONG DEGREE OF ORIENTATION IN VERTICAL DIRECTION WITH RESPECT TO SUBSTRATE SURFACE WHEN CRYSTAL PHASE IS WURTZRITE TYPE (a-AXIS OR c-AXIS) | SPUTTERING GAS PRESSURE (Pa) | COMPOSITION RATIO | | | | RESULT OF ELECTRIC PROPERTIES | |
|---|---|---|---|---|---|---|---|---|---|---|---|
| | | | | | | Ti (%) | Al (%) | N (%) | Al/(Ti + Al) (%) | S CONSTANT (K) | SPECIFIC RESISTANCE VALUE AT 25° C. (Ω cm) |
| EXAMPLE 6 | WURTZITE TYPE | | 0.34 | c-AXIS | <0.67 | 9 | 43 | 48 | 83 | 2727 | 2.E+04 |
| EXAMPLE 7 | WURTZITE TYPE | | 0.09 | c-AXIS | <0.67 | 8 | 44 | 48 | 84 | 2665 | 3.E+03 |
| EXAMPLE 8 | WURTZITE TYPE | | 0.05 | c-AXIS | <0.67 | 8 | 44 | 48 | 85 | 2527 | 1.E+03 |
| EXAMPLE 9 | WURTZITE TYPE | | <0.01 | c-AXIS | <0.67 | 8 | 45 | 47 | 86 | 2557 | 8.E+02 |
| EXAMPLE 19 | WURTZITE TYPE | | 2.50 | a-AXIS | ≥0.67 | 9 | 44 | 47 | 83 | 2571 | 5.E+03 |
| EXAMPLE 20 | WURTZITE TYPE | | 9.09 | a-AXIS | ≥0.67 | 8 | 46 | 46 | 84 | 2501 | 6.E+03 |
| EXAMPLE 21 | WURTZITE TYPE | | 6.67 | a-AXIS | ≥0.67 | 8 | 45 | 47 | 84 | 2408 | 7.E+03 | angle of 1 degree. No peak which could be indexed as a wurtzite-type (space group: $P6_3mc$ (No. 186)) was detected, and thus, the material according to this Comparative Example was confirmed as a NaCl-type single phase.

Next, the correlations between a crystal structure and its electric properties were further compared with each other in detail regarding the Examples of the present invention in which the wurtzite-type materials were employed.

Figure 11:
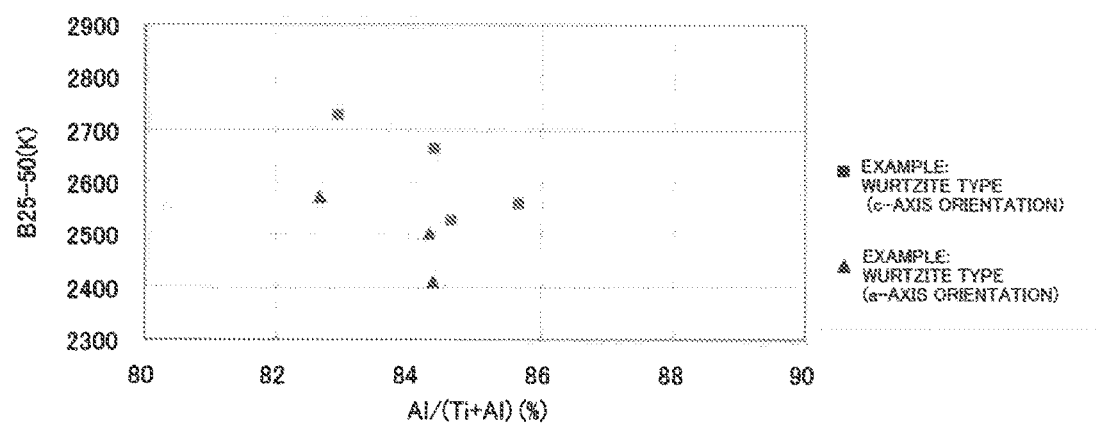
FIG. 11 is a graph illustrating the relationship between an Al/(Ti+Al) ratio and a B constant for the comparison of a material exhibiting a strong a-axis orientation and a material exhibiting a strong c-axis orientation according to Examples of the present invention.
Figure 12:
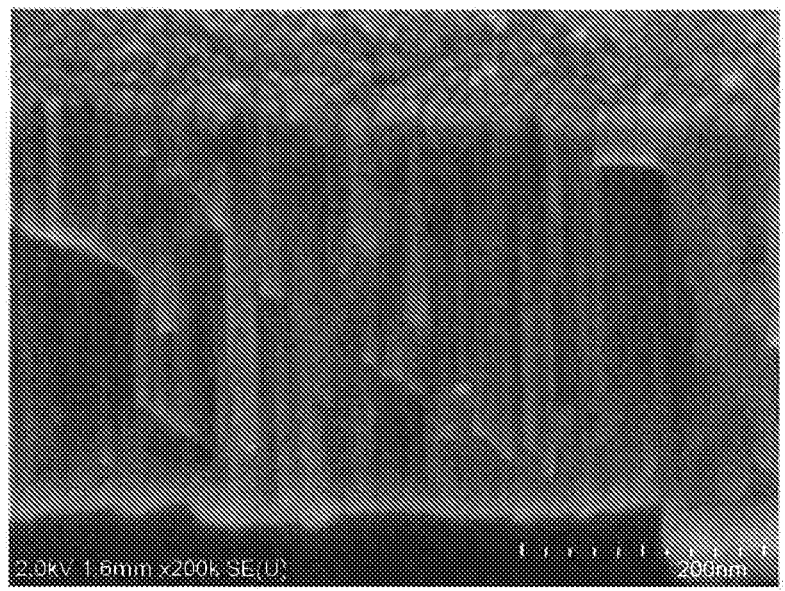
FIG. 12 is a cross-sectional SEM photograph illustrating a material exhibiting a strong c-axis orientation according to an Example of the present invention.
Figure 13:
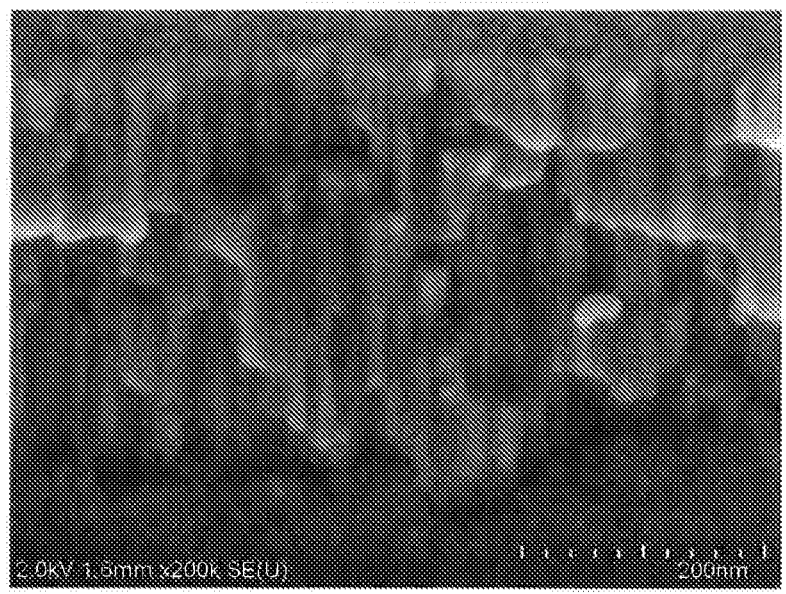
FIG. 13 is a cross-sectional SEM photograph illustrating a material exhibiting a strong a-axis orientation according to an Example of the present invention.

As shown in Table 3 and FIG. 11, the crystal axis of some materials (Examples 5, 7, 8, and 9) is strongly oriented along Next, as an exemplary crystal form in the cross-section of the thin film thermistor portion 3, a cross-sectional SEM photograph of the thin film thermistor portion 3 according to one Example (where Al/(Ti+A)=0.84, wurtzite-type hexagonal, and strong c-axis orientation), which is deposited on the Si substrate S with a thermal oxidation film, is shown in FIG. 12. In addition, a cross-sectional SEM photograph of the thin film thermistor portion 3 according to another Example (where Al/(Ti+Al)=0.83, wurtzite-type hexagonal, and strong a-axis orientation) is shown in FIG. 13.

The samples of these Examples were obtained by breaking the Si substrates S by cleavage. The photographs were taken by tilt observation at an angle of 45 degrees.

As can be seen from these photographs, the samples were formed of high-density columnar crystals in all Examples. Specifically, the growth of columnar crystals in a vertical direction with respect to the surface of the substrate was observed both in the Examples revealing a strong c-axis orientation and in the Examples revealing a strong a-axis orientation. Note that the break of the columnar crystals was generated upon breaking the Si substrate S by cleavage.

<Heat Resistance Test Evaluation>

In the Examples and Comparative Example shown in Table 4, a resistance value and a B constant before and after the heat resistance test at a temperature of 125° C. for 1000 hours in air were evaluated. The results are shown in Table 4. A conventional Ta—Al—N-based material according to a Comparative Example was also evaluated in the same manner for comparison.

As can be seen from these results, although the Al concentration and the nitrogen concentration vary, the heat resistance of the Ti—Al—N-based material based on the electric properties change before and after the heat resistance test is more excellent than that of the Ta—Al—N-based material according to the Comparative Example when comparison is made by using the materials according to the Examples having the same B constant as that of the Ta—Al—N-based material according to the Comparative Example. Note that the materials according to Examples 5 and 8 have a strong c-axis orientation, and the materials according to Examples 21 and 24 have a strong a-axis orientation. When both groups were compared to each other, the heat resistance of the materials according to the Examples revealing a strong c-axis orientation is slightly improved as compared with that of the materials according to the Examples revealing a strong a-axis orientation.

Note that, in the Ta—Al—N-based material, the ionic radius of Ta is much larger than that of Ti and Al, and thus, a wurtzite-type phase cannot be produced in the high-concentration Al region. It is contemplated that the Ti—Al—N-based material having a wurtzite-type phase has better heat resistance than the Ta—Al—N-based material because the Ta—Al—N-based material is not a wurtzite-type phase.

The technical scope of the present invention is not limited to the aforementioned embodiments and Examples, but the present invention may be modified in various ways without departing from the scope or teaching of the present invention.

For example, in the above-described embodiments, although the comb shaped portions of the pair of opposed electrode portions extend so as to be opposed to each other in the extending direction (longitudinal direction) of the insulating film, the comb shaped portions may extend so as to be opposed to each other in the direction orthogonal to the extending direction of the insulating film.

REFERENCE NUMERALS 1, 21: temperature sensor, 2: insulating film, 3: thin film thermistor portion, 4 and 24: pattern electrode, 4a and 24a: opposed electrode portion

What is claimed is:

1. A temperature sensor comprising:
an insulating film;
a thin film thermistor made of a Ti—Al—N-based thermistor material on the insulating film; and a pair of pattern electrodes formed on the insulating film with a pair of opposed electrode portions being arranged so as to be opposed to each other on the thin film thermistor, wherein the pair of the opposed electrode portions covers the entire surface of the thin film thermistor excluding the region between the opposed electrode portions.

2. The temperature sensor according to claim 1, wherein the pair of opposed electrode portions further expands to the outside of an outer border of the thin film thermistor, and covers the surroundings of the thin film thermistor.

3. The temperature sensor according to claim 1, wherein the thin film thermistor consists of a metal nitride represented by the general formula: $Ti_xAl_yN_z$ (where $0.70 \leq y/(x+y) \leq 0.95$, $0.4 \leq z \leq 0.5$, and $x+y+z=1$), wherein the crystal structure thereof is a hexagonal wurtzite-type single phase.

TABLE 4

| | M ELEMENT | M (%) | Al (%) | N (%) | Al/(M + Al) (%) | B25-50 (K) | SPECIFIC RESISTANCE VALUE AT 25° C. (Ω cm) | RISING RATE OF SPECIFIC RESISTANCE AT 25° C. AFTER HEAT RESISTANCE TEST AT 125° C. FOR 1,000 HOURS (%) | RISING RATE OF S CONSTANT AFTER HEAT RESISTANCE TEST AT 125° C. FOR 1,000 HOURS (%) |
|---|---|---|---|---|---|---|---|---|---|
| COMPARATIVE EXAMPLE | Ta | 60 | 1 | 39 | 2 | 2671 | 5.E+02 | 25 | 16 |
| EXAMPLE 5 | Ti | 9 | 43 | 48 | 83 | 2727 | 2.E+04 | <4 | <1 |
| EXAMPLE 8 | Ti | 8 | 44 | 48 | 85 | 2527 | 1.E+03 | <4 | <1 |
| EXAMPLE 21 | Ti | 8 | 45 | 47 | 84 | 2408 | 7.E+03 | <5 | <1 |
| EXAMPLE 24 | Ti | 6 | 51 | 43 | 89 | 2599 | 7.E+04 | <5 | <1 |

* * * * *